W. A. LLOYD.
Neck-Yokes.
No. 155,033.  Patented Sept. 15, 1874.
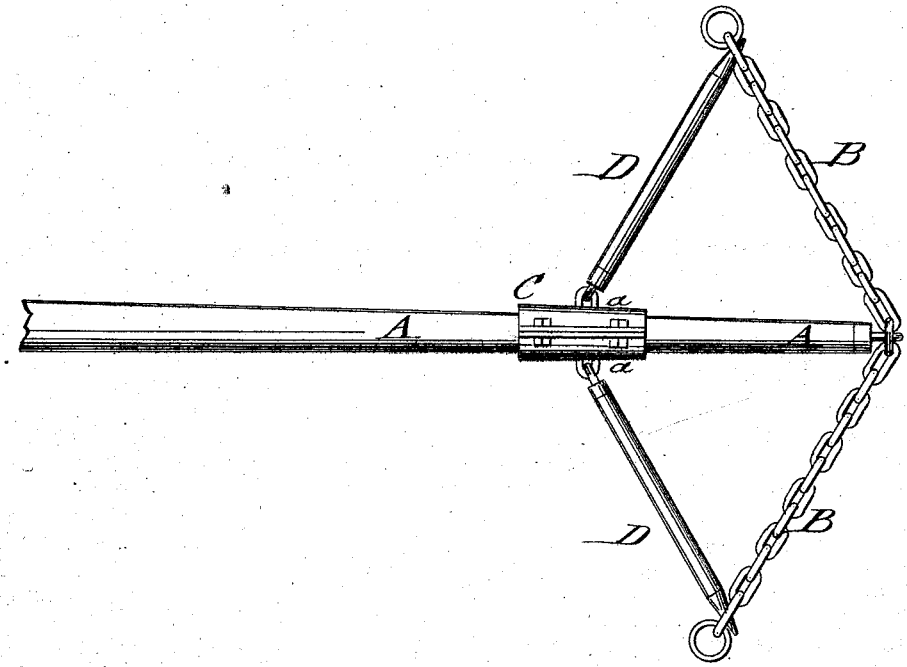
WITNESSES:
INVENTOR:
Wm. A. Lloyd
BY
ATTORNEYS.

UNITED STATES PATENT OFFICE.

WILLIAM A. LLOYD, OF CHESHIRE, MASSACHUSETTS.

IMPROVEMENT IN NECK-YOKES.

Specification forming part of Letters Patent No. 155,033, dated September 15, 1874; application filed August 22, 1874.

*To all whom it may concern:*

Be it known that I, WILLIAM A. LLOYD, of Cheshire, in the county of Berkshire and State of Massachusetts, have invented a new and Improved Spreading Attachment to Vehicle-Poles, of which the following is a specification:

The accompanying drawing represents a top view of my improved spreading attachment to vehicle-poles.

The object of my invention is to relieve the horses from the sudden strain caused by the pole and collar connecting chains, when the vehicle-pole is thrown, by rough roads or obstructions, in an upward or downward inclined position, so that the sudden jerks on the chains will not choke or otherwise hurt the horses.

My invention consists of spreading poles or rods, which are adjustably applied in connection with the pole end of a vehicle and the collar-connecting chains.

In the drawing, A represents the pole or shaft of any vehicle; and B the collar-connecting chains, which are attached, either stationary or by means of a slide-piece, to the front end of the pole. At suitable distance from the end are applied to fixed or movable clips C, having staples a, the spreader-poles D, which are, with their pointed ends, placed into the links of the chains at such distance from the pole as required by the height of the horses, and their position to the pole. By placing the spreading-rods nearer to or farther from the pole, a smaller or larger swinging action is imparted to the chains. The spreaders are held in position by the strain on the chains, but may, for greater security, be applied by a spring-catch or other suitable connecting device.

The triangles formed by spreader-rods and chains swing readily at both sides above and below the pole, according to the higher or lower position of the same, and neutralize thereby the injurious and annoying jerks on the necks of the horses. A very practical, neat, and readily-disconnected attachment for the heavier and lighter kinds of vehicles is thereby produced, which effectually avoids the strain of the poles on the horses.

Having thus described my invention, I claim as new and desire to secure by Letters Patent—

The spreading attachment to vehicle-poles, composed of lateral spreading-rods, in combination with the pole and the collar-connecting chains, substantially as and for the purpose set forth.

WILLIAM A. LLOYD.

Witnesses:
R. A. FILKINS,
PAUL GOEPEL.